Jan. 31, 1961 R. E. LAMBERT ET AL 2,969,613
APPARATUS FOR BENDING ARTICLES OF GLASS
OR OTHER THERMOPLASTIC MATERIALS
Original Filed Oct. 2, 1950 2 Sheets-Sheet 1
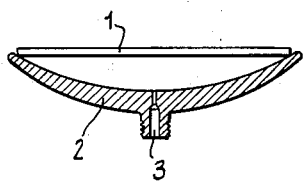
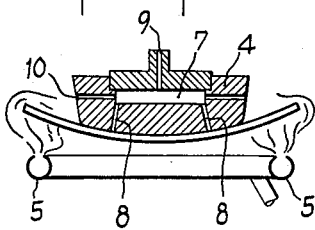
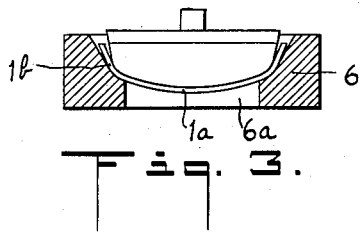
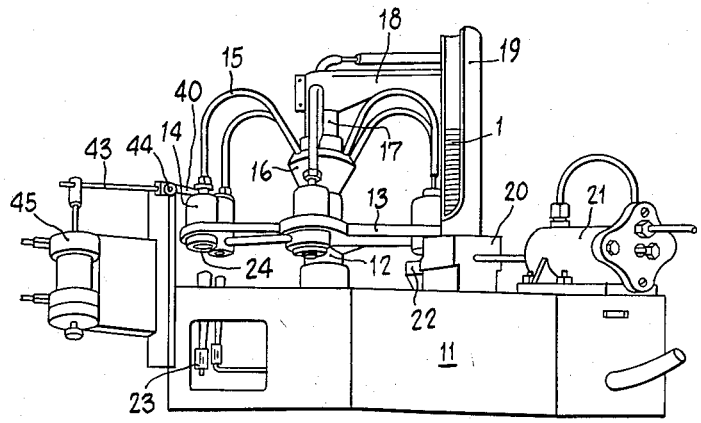
INVENTORS
ROGER EMILE LAMBERT
BY MICHEL DUBESSET

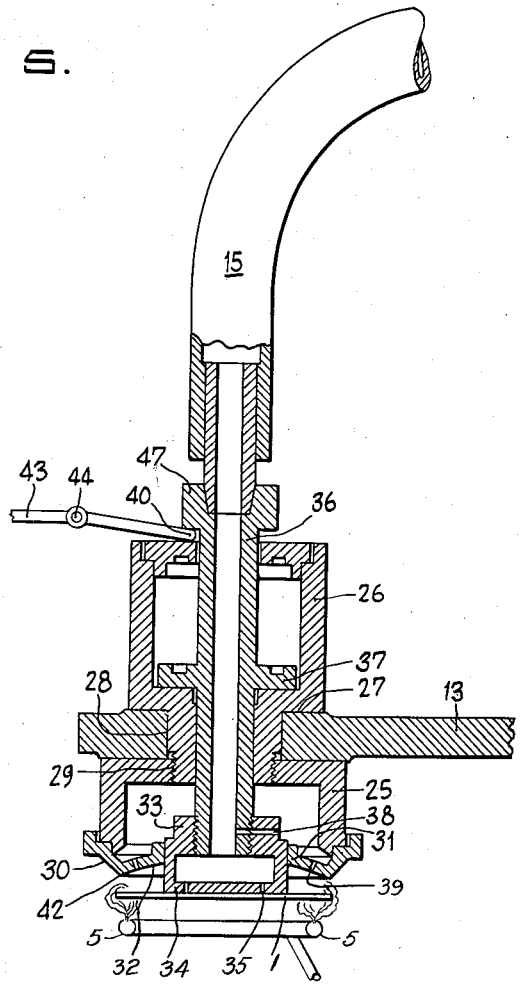

United States Patent Office 2,969,613
Patented Jan. 31, 1961

2,969,613

APPARATUS FOR BENDING ARTICLES OF GLASS OR OTHER THERMOPLASTIC MATERIALS

Roger Emile Lambert, Paris, and Michel Dubesset, Le Vesinet, France, assignors to Compagnie de Saint-Gobain, Paris, France Original application Oct. 2, 1950, Ser. No. 187,964, now Patent No. 2,817,928, dated Dec. 31, 1957. Divided and this application Nov. 8, 1957, Ser. No. 695,457

Claims priority, application France Oct. 3, 1949

7 Claims. (Cl. 49—7)

The present invention has for its object an apparatus for shaping articles of glass or other thermoplastic materials, and more particularly articles the curvature of which is different in the central part and on the borders such as for example, certain watch glasses, and the plates constituting the bottom of television bulbs, which have at their edges a curvature much more accentuated than towards the center. This invention relates also to apparatus for the manufacture of articles having a surface part of which is plane, the remaining part having a determined curvature.

This application is a division of application Serial No. 187,964, filed October 2, 1950, now Patent No. 2,817,928 issued December 31, 1957.

The usual processes for making curved glass consist generally in pressing sheets, previously cut to the appropriate sizes, between two conforming elements, and heating the whole to a temperature sufficient to obtain a softening sufficient to permit the desired deformation. In case certain zones of an object are to be provided with a very accentuated curvature, it has been necessary to heat the piece to a high temperature, with the result that the pressing often causes alterations of the surfaces such as pin holes and scratches, which are the more marked as the temperature is higher. Those alterations are prejudicial to the quality of the finished article as they appear not only on the parts of the surface having a great curvature but also on any other part of the surface.

The object of the present invention is to provide an apparatus to produce a thermoplastic article having different parts differently curved while avoiding any such alterations of the surfaces, at least in the part of the article having the smallest curvature, which generally constitutes the most important part of the article and where it is essential that the article be without defects.

The procedure, according to the invention, for producing an article of glass, or of other thermoplastic materials, having different curvatures, compound curves, consists in conforming the article to a preliminary shape so as to obtain the smallest curvature on all the surface of the article, and in bringing this preliminarily shaped article to the final form after having heated the parts to which a more accentuated curvature must be given, and the latter only, to the high temperature necessary to confer to them this curvature, the part of the preliminarily shaped article which has already received its final curvature being maintained at a temperature comprised between the lowest temperature of release of the tensions, at which all risks of breakage are avoided, and the temperature at which defects of the surface may appear. The shaping of the article, at least for the parts which must have the more accentuated curvature, is obtained by pressing in a mold or on a form.

The pre-shaped article, in its first shape, may have been prepared at any time, but it is advantageous to have the final shaping follow the preliminary shaping immediately. It is thus possible to take advantage of the heat retained from the preliminary shaping operation.

In case the article to be obtained has a plane part connected to a part of great curvature, the operation of pre-shaping consists in forming a plane sheet. Such sheets are manufactured currently and can be obtained in trade. In such a case, the two operations are obviously effected separately.

In any case, in order to carry out the final conformation, it is necessary, according to the invention, to heat the parts having a small curvature or no curvature at all, and the parts which must receive a greater curvature to different temperatures. For this purpose, different means can be used which are all comprised within the scope of the invention and the examples given hereafter are not to be considered as limitative in this respect.

It is possible to obtain an unequal heating of the different parts by heating means arranged and regulated in an appropriate manner.

It is also possible to submit the piece on all its surface to an almost uniform heating to a temperature sufficient to obtain the most accentuated curvature, however in such a case the part already conformed to the desired smallest curvature is submitted, at the same time, to a cooling action. This cooling can be obtained, for example, by bringing a metallic mass into contact with the part that is not to be further deformed, thus dissipating part of the calories which are transmitted to it by the heating means, it being possible to submit this metallic mass itself to a permanent or intermittent artificial cooling.

If necessary, it is also possible, in order to obtain greater efficiency, to combine the stated cooling method with a heating that is applied more intensively to the part which has to undergo the most accentuated deformation than to the parts that have acquired their final shape.

By way of example, there is described hereafter with references to the attached drawings, two embodiments of an apparatus and a machine according to the invention.

Figs. 1, 2 and 3 show schematically an apparatus for bending pieces having a curvature increasing from the center to the edges.

Fig. 4 shows an axial section of an automatic machine for the shaping of eyeglass lenses, the central parts of which are relatively plane and the borders of which are greatly curved.

Fig. 5 shows an element of this machine.

Fig. 1 shows the sheet or blank of glass 1 which is to be conformed according to the shape 1a—1b shown in Fig. 3. The sheet of glass is first placed on a mold 2 on which it lies at its edges. This mold, of a concave shape, has the determined curvature which is to be given to the central part of the article to be manufactured. The glass and the mold are heated to an appropriate temperature, then a vacuum is created in the space comprised between the glass and the mold, through an orifice 3 passing through the bottom of the mold and communicating with a vacuum pump. On account of the difference of pressure exerted on its two surfaces, the whole glass sheet is caused to take the curvature intended only for its central part. As this operation is effected at a temperature which may be relatively low, the deformation to be given to the glass being small, and as on the other hand the glass is not pressed mechanically against the bottom of the mold, it is thus possible to avoid any marring of the surface, which remains perfectly polished.

Then air is caused to enter through orifice 3; the piece, thus freed, is taken up by a suction element 4 (Fig. 2) of a convex form having the same curvature as the central part of the piece. This suction element has a hollow chamber 7 communicating with the exterior through orifices 8 located in the part of the element engaging the piece. A vacuum is exerted in chamber 7 through an orifice 9 communicating with the vacuum pump. The piece is thus suspended on the suction element by the vacuum. By means of an annular gas burner 5, for example, placed beneath the piece, the borders of this piece are then heated very hot whereas its central part is cooled by its contact with the metal of the suction element 4. In order that the heating shall also be applied to the top surface of that part of the glass which is to be greatly cured, orifices 10 of small dimensions are provided around the suction element 4 to draw the flames inward over the edge and in heating relation to the top of the plate in such a manner that the glass is heated on both sides at the rim.

The piece, still remaining suspended on the suction element 4, is then brought to the mold (Fig. 3) which is hollow in the central part 6a which corresponds to the part 1a of the piece which already has its final small curvature. This mold has the shape 1b to be given to the border of the piece. The piece is pressed between the mold and the suction element and receives thus its definite shape; this pressing is facilitated by the vacuum exerted continuously through orifices 10. The piece is then freed by penetration of air into chamber 7.

The succeeding operations can be effected mechanically and automatically.

Fig. 4 shows, in a perspective view, an automatic machine for the manufacture, by the process of the invention, of watch glasses, which are curved only on their borders and are plane in their central parts.

The machine is composed essentally of a stand 11 containing the driving device which causes the vertical shaft 12 to turn at regular intervals and each time for a fractional part of a revolution. This vertical shaft 12 bears the plate 13 on which are disposed at regular intervals the suction elements 14 described in the following paragraphs.

Each of these suction elements is connected by means of pliable pipes 15 to a corresponding hole in a head 16 rotating with shaft 12. This head 16 is adjustable on a circular fixed shaft 17 connected to the stand by an arm 18, the support of which is not shown on the drawing. The holes in the head 16 emerge at the level of two circular grooves, not shown, provided each on a part of the circumference of the shaft 17, which successively connect each of the suction elements with a vacuum source and the atmosphere.

In the hollow column 19 supported by the stand of the machine are stored the flat discs 1 out of which the watch crystals are to be made.

On the base of this column is disposed a slide 20 coupled to a motor piston reciprocating in a cylinder 21 operated by compressed air. The movements of the piston are controlled by those of the machine in such a manner that every time a suction element is stopped before the column 19, the lower disc, before which the suction element has arrived, is pushed by the slide 20 onto an element partially shown at 22, where it is centered. Under the action of another pneumatic cylinder, hidden in the stand of the machine, this centering element is lifted and brings the disc against the vacuum face of a suction element, where it remains suspended. The orientation of shaft 17 is regulated in such a manner that the vacuum is applied to each suction element at this station. The length of the circular groove of shaft 17 connected to the vacuum source is such that the vacuum remains connected to the suction element in the course of the greatest part of the revolution of plate 13. Plumb with the station points of the suction elements, vertical gas burners are provided, some of which are shown at 23, and which are regulated in an appropriate manner so as to heat the glass progressively until the borders reach the appropriate temperature. At station 24 the curvature is taking place, according to the invention, the disc being still suspended on the suction element. Immediately afterwards, in the course of the revolution of plate 13, after the suction element has left station 24, the curved finished glass is detached from the suction element by admitting atmospheric air to the suction element through the second groove in shaft 17. Finally, at the next station, the suction element is cooled by means of an air blowing system. Then it is ready for a new cycle.

The same cycle is repeated mechanically in the same manner for each suction element, the number of curved glasses for a revolution of the plate 13 being equal to the number of suction elements. The curvature taking place at station 24, can be effected, according to the method described above, by pressing the disc of glass in a form as shown in Fig. 3.

By way of another example, there is described hereafter another mode of application of the conformation method which is the object of the present invention, applied to the machine considered. The suction element shown in axial section on Fig. 5 comprises a hollow body 25 fixed beneath plate 13 in the following manner: a cylinder 26, bears at 27 on the plate, and a cylindrical extension 28 of the cylinder 26 is seated in a hole in the plate of corresponding shape; it is terminated by a threading 29 on which the hollow body 25 is screwed. On the latter is screwed in its turn a piece 30 provided with a circular orifice 31. The shape 32 of this piece has the curvature to be given to the article along its borders. Slidably mounted in the orifice 31 is a movable piece 33 having a hollow chamber, the lower plane wall 34 of which is provided with holes 35 of a small diameter.

The piece 33 is mounted on the end of a pipe or hollow piston rod 36 which carries piston 37 in cylinder 26. The pipe 36 bears an enlargement 37 limiting the travel of the piece downwards. The pipe 36 is put into communication successively with the vacuum and with the atmosphere as explained above.

At the moment the centering element has been lifted up, the glass disc 1 has been applied against the lower face 34 of piece 33 on which it remains suspended due to the vacuum created in it. During the stopping above the burners, the disc 1 is heated and it is heated to a higher temperature on the borders than in the central part which is cooled by the colder metal in contact with it. The difference of temperature is accentuated by providing means 34 with a channel 38 which creates a vacuum in the chamber of the hollow body 25, thus causing a suction of air through the orifices 39 provided in a mold 30 disposed around it. The air exhausted through these orifices causes the flames to pass around the border of the plate 1 and thus to heat the rim of the disc beneath and above. This arrangement reduces the time of heating and consequently increases the output of the machine.

By these two means it is easily possible to obtain the difference of temperature which characterizes the present invention, this difference being maintained by cooling plate 34 by means of an air jet after the curved glass has been freed.

The suction element having arrived at station 24 of Fig. 4, the pipe 36 is lifted up suddenly by finger 40, see also Fig. 3, which, in the course of the revolution of the plate, has been engaged between the chamber 26 and a flange 41 of the end of pipe 36, then the pipe is taken back downwards by a reverse movement of finger 40.

In the upward movement, the disc 1, the borders of which have been reached the desired temperature, is brought into contact with the periphery of the lower side 42 of mold 30 and, under the effect of the vacuum exerted between mold 30 and the disc 1 through the channel 38 and the orifices 39, the disc is pressed by the atmospheric pressure against the mold 30, the central part of the bottom of which is formed by plate 34 after it has been raised. Then the operation is terminated. After the descent of the tube 36, the glass is freed by the penetration of air into tube 36 in the course of the intermittent fractional turn of the apparatus and the suction element is ready for a new operation.

The ascending and descending movements of the finger 40 are obtained through a lever arm 43 articulated on an axis 44 mounted on the stand of the machine, this lever receiving motion from the piston rod of a pneumatic cylinder 45 (Fig. 4).

The best conditions are provided by the suction element described to obtain glass articles without any alteration of their surfaces, the glass being in contact with the metal on one side only and not supporting any mechanical pressure. In particular, the central part of the glass article, although it is in prolonged contact with the metal, remains practically without any alteration, as it is not heated to the softening temperature.

The machine described hereinabove is intended to manufacture articles such as watch glasses, having a curvature only on the borders. In case the center part itself is to be given a curvature, but less accentuated than that of the borders, the machine can easily be adapted to the manufacture of those articles. It would be sufficient to give to the surface 34 of piece 33 the curvature to be given to the center part and to feed the machine with the articles pre-manufactured to the preliminary shape having said curvature. It would also be possible to combine the machine with a machine manufacturing the articles with the preliminary shape and delivering them at the rate of the first machine.

What is claimed is:

1. An apparatus for the production of thermoplastic materials, in particular of glass, having two different curvatures, which comprises a suction element supporting the article which has been preliminary-shaped and presenting on all its surface the smallest desired curvature in the article, the suction element having an article-engaging face somewhat smaller than the face of the article engaged thereby so that an edge portion of the preliminary-shaped article protrudes beyond the suction element in at least one peripheral zone, flame heating means confronting that surface of the protruding edge portion of the thus held article which is remote from the suction element, and means on the same side of the article as the suction element having at least one suction port in the zone of the protruding edge whereby the flames are sucked around the protruding edge portion of the article to engage both broad surfaces thereof.

2. An apparatus as claimed in claim 1 wherein the flame-directing suction port is located on a side of the suction element.

3. An apparatus as claimed in claim 1 comprising a mold for shaping the protruding edge of the article after it has been heated to softening temperature.

4. An apparatus as claimed in claim 3 wherein the mold is positioned to engage the face of the protruding edge portion of the article remote from the suction element.

5. An apparatus as claimed in claim 3 wherein the mold is positioned to engage the face of the protruding edge portion of the article on the same side of the article as the suction element.

6. An apparatus as claimed in claim 5 wherein the mold is spaced from the protruding edge portion of the article during the heating operation, and the mold has at least one flame-directing suction port in the zone of the protruding edge portion of the article.

7. An apparatus for the production of thermoplastic materials, in particular of glass, having at least two different curvatures, which comprises a suction element supporting the article which has been preliminary-shaped and conforming on all its article-engaging surfaces to the curvature of a substantial zone of the preliminarily shaped article, the suction element having a face engaging said zone of the article, said face of the element being somewhat smaller than the face of the article engaged thereby so that an edge portion of the preliminary-shaped article protrudes beyond the suction element in at least one edge portion of the suction element, heating means confronting that surface of the protruding edge portion of the thus held article which is remote from the suction element, and means on the same side of the article as the suction element having at least one suction port in the zone of the protruding edge of the article whereby gas heated by the heating means is sucked around the protruding edge portion of the article to engage both broad surfaces thereof.

References Cited in the file of this patent
UNITED STATES PATENTS

| | | |
|---|---|---|
| 1,236,937 | Hough | Aug. 14, 1917 |
| 1,482,789 | Gmelin | Feb. 5, 1924 |
| 1,816,280 | Dawson et al. | July 28, 1931 |
| 2,186,174 | Pearson | Jan. 9, 1940 |
| 2,396,988 | Cutler | Mar. 19, 1946 |
| 2,442,338 | Borkland | June 1, 1948 |